US012641576B2

(12) United States Patent
    Tsai et al.

(10) Patent No.: US 12,641,576 B2
(45) Date of Patent: May 26, 2026

(54) TECHNIQUES FOR UE POWER SAVING AND UE COMPLEXITY REDUCTION

(71) Applicant: MEDIATEK INC., Hsinchu (TW)

(72) Inventors: Chiou-Wei Tsai, Hsinchu (TW); Wei-De Wu, Hsinchu (TW); Yi-Chia Lo, Hsinchu (TW); Tien-Shin Ho, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 302 days.

(21) Appl. No.: 18/369,907

(22) Filed: Sep. 19, 2023

(65) Prior Publication Data

US 2024/0114487 A1      Apr. 4, 2024

Related U.S. Application Data

(60) Provisional application No. 63/423,459, filed on Nov. 7, 2022, provisional application No. 63/382,554, filed on Nov. 7, 2022, provisional application No. 63/412,363, filed on Sep. 30, 2022.

(51) Int. Cl.
    *H04W 72/044* (2023.01)
(52) U.S. Cl.
    CPC ................................. *H04W 72/044* (2013.01)
(58) Field of Classification Search
    CPC .................................................. H04W 72/044
    See application file for complete search history.

(56) References Cited

U.S. PATENT DOCUMENTS

| 11,139,927 B2 * | 10/2021 | Al-Imari | ............... H04L 1/1829 |
| 2020/0112401 A1 * | 4/2020 | Al-Imari | ............... H04L 1/1822 |

| 2020/0228966 A1 * | 7/2020 | Xu | ......................... H04W 72/23 |
| 2021/0007052 A1 * | 1/2021 | Zhang | .................... H04W 76/28 |
| 2022/0053522 A1 * | 2/2022 | MolavianJazi | ... H04W 72/0453 |
| 2022/0109543 A1 * | 4/2022 | Ma | ....................... H04W 72/044 |
| 2022/0210806 A1 * | 6/2022 | Rastegardoost | ...... H04L 5/0094 |
| 2023/0058672 A1 * | 2/2023 | Guo | .................. H04W 52/0219 |
| 2023/0104269 A1 * | 4/2023 | He | .......................... H04W 8/22 370/329 |
| 2023/0144052 A1 * | 5/2023 | Islam | .................... H04L 5/0007 370/329 |
| 2023/0217498 A1 * | 7/2023 | Lee | ................... H04W 74/0833 370/329 |
| 2023/0319708 A1 * | 10/2023 | Ma | ........................ H04W 72/51 455/574 |

(Continued)

FOREIGN PATENT DOCUMENTS

WO        2021230701 A1    11/2021

OTHER PUBLICATIONS

Euporean Search Report, Jan. 9, 2024, Germany.

*Primary Examiner* — Parth Patel
(74) *Attorney, Agent, or Firm* — Troutman Pepper Locke LLP; Tim Tingkang Xia, Esq.

(57)        ABSTRACT

In an aspect of the disclosure, a method, a computer-readable medium, and an apparatus are provided. The apparatus may be a UE. The UE receives, in a first slot and from a base station, a first signal that is a downlink data signal in a first frequency resource allocation. The UE communicates, with the base station, a second signal in a second slot. A configured time gap between the first slot and the second slot is according to a comparison of the first frequency resource allocation and a second frequency resource allocation.

16 Claims, 12 Drawing Sheets

700

(56)         References Cited

U.S. PATENT DOCUMENTS

| | | | |
|---|---|---|---|
| 2023/0344592 A1* | 10/2023 | Zhou | H04W 52/0235 |
| 2024/0014979 A1* | 1/2024 | Lei | H04L 5/16 |
| 2024/0031056 A1* | 1/2024 | Rastegardoost | H04W 74/0833 |
| 2024/0032103 A1* | 1/2024 | Rastegardoost | H04W 74/0833 |
| 2024/0114487 A1* | 4/2024 | Tsai | H04W 72/044 |
| 2024/0306208 A1* | 9/2024 | Shin | H04W 72/04 |
| 2024/0357593 A1* | 10/2024 | Wang | H04L 1/1854 |
| 2024/0357664 A1* | 10/2024 | Wang | H04W 8/24 |
| 2025/0024441 A1* | 1/2025 | Lee | H04W 72/232 |
| 2025/0031188 A1* | 1/2025 | Kim | H04L 5/0016 |
| 2025/0261240 A1* | 8/2025 | Li | H04W 74/0833 |
| 2025/0287238 A1* | 9/2025 | Zhou | H04W 24/08 |

* cited by examiner

506

504

502

500

PDCCH

DL Data

Common
UL Burst

Preamble 1040
(PRACH)

$t_0$

PDCCH 1042
DCI 1070

$t_1$

PDSCH 1044
Random Access Response $t_2$

PUSCH 1046
Message 3

$t_3$

PDCCH 1047

$t_4$

PDSCH 1048
Message 4

$t_5$

1002

1004

1000

1100

1102    report a processing capability and/or an early indication to a base station 1104    receive, in a first slot and from the base station, a first signal that is a downlink data signal in a first frequency resource allocation 1106    communicates, with the base station, a second signal in a second slot.

1202   receive a report of a processing capability and/or an early indication from a UE 1204   transmit, to the UE, in a first slot a first signal that is a downlink data signal in a first frequency resource allocation 1206   determine a configured time gap between the first slot and a second slot 1208   communicate, with the UE, a second signal in the second slot

TECHNIQUES FOR UE POWER SAVING AND UE COMPLEXITY REDUCTION

CROSS-REFERENCE TO RELATED APPLICATION(S)

This application claims the benefits of U.S. Provisional Application Ser. No. 63/412,363, entitled "METHOD FOR UE POWER SAVING AND/OR UE COMPLEXITY REDUCTION" and filed on Sep. 30, 2022, the benefits of U.S. Provisional Application Ser. No. 63/382,554, entitled "METHODS FOR SCHEDULING PAGING MESSAGE TO UE WITH REDUCED PROCESSING CAPABILITY" and filed on Nov. 7, 2022, and the benefits of U.S. Provisional Application Ser. No. 63/423,459, entitled "METHODS FOR SCHEDULING UE WITH REDUCED PROCESSING CAPABILITY" and filed on Nov. 7, 2022, all of which are expressly incorporated by reference herein in their entirety.

BACKGROUND

Field

The present disclosure relates generally to communication systems, and more particularly, to techniques of scheduling a user equipment (UE) to receive physical downlink shared channels (PDSCHs) in accordance with a reduced capability.

Background

The statements in this section merely provide background information related to the present disclosure and may not constitute prior art.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a UE. The UE receives, in a first slot and from a base station, a first signal that is a downlink data signal in a first frequency resource allocation. The UE communicates, with the base station, a second signal in a second slot. A configured time gap between the first slot and the second slot is according to a comparison of the first frequency resource allocation and a second frequency resource allocation.

In an aspect of the disclosure, a method, a computer-readable medium, and an apparatus are provided. The apparatus may be a base station. The base station transmits, in a first slot, a first signal that is a downlink data signal in a first frequency resource allocation. The base station communicates, with a UE, a second signal in a second slot. A configured time gap between the first slot and the second slot is according to a comparison of the first frequency resource allocation and a second frequency resource allocation.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
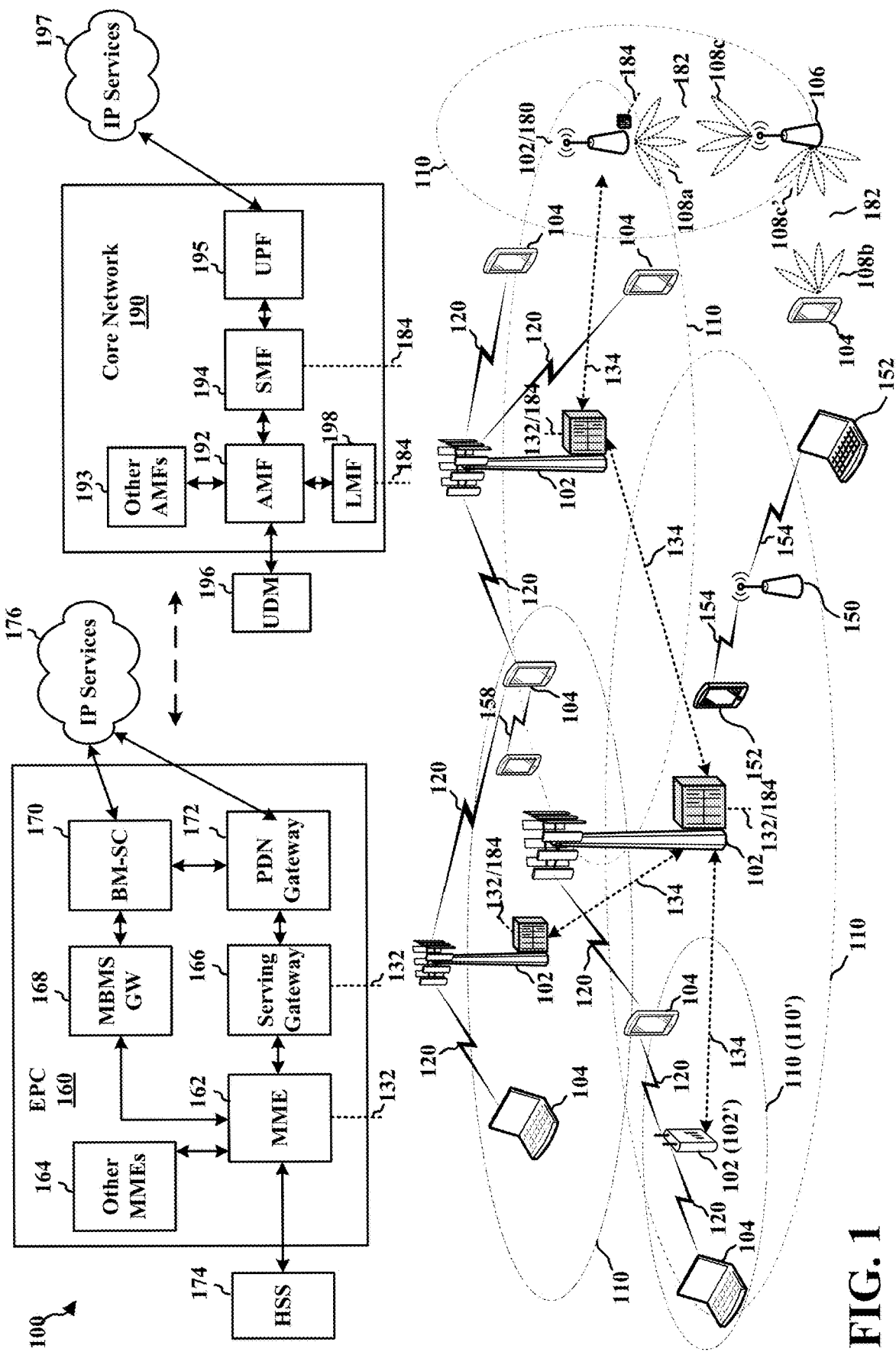
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunications systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., SI interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to 7 MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 108a. The UE 104 may receive the beamformed signal from the base station 180 in one or more receive directions 108b. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a location management function (LMF) 198, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the SMF 194 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the present disclosure may reference 5G New Radio (NR), the present disclosure may be applicable to other similar areas, such as LTE, LTE-Advanced (LTE-A), Code Division Multiple Access (CDMA), Global System for Mobile communications (GSM), or other wireless/radio access technologies.

Figure 2:
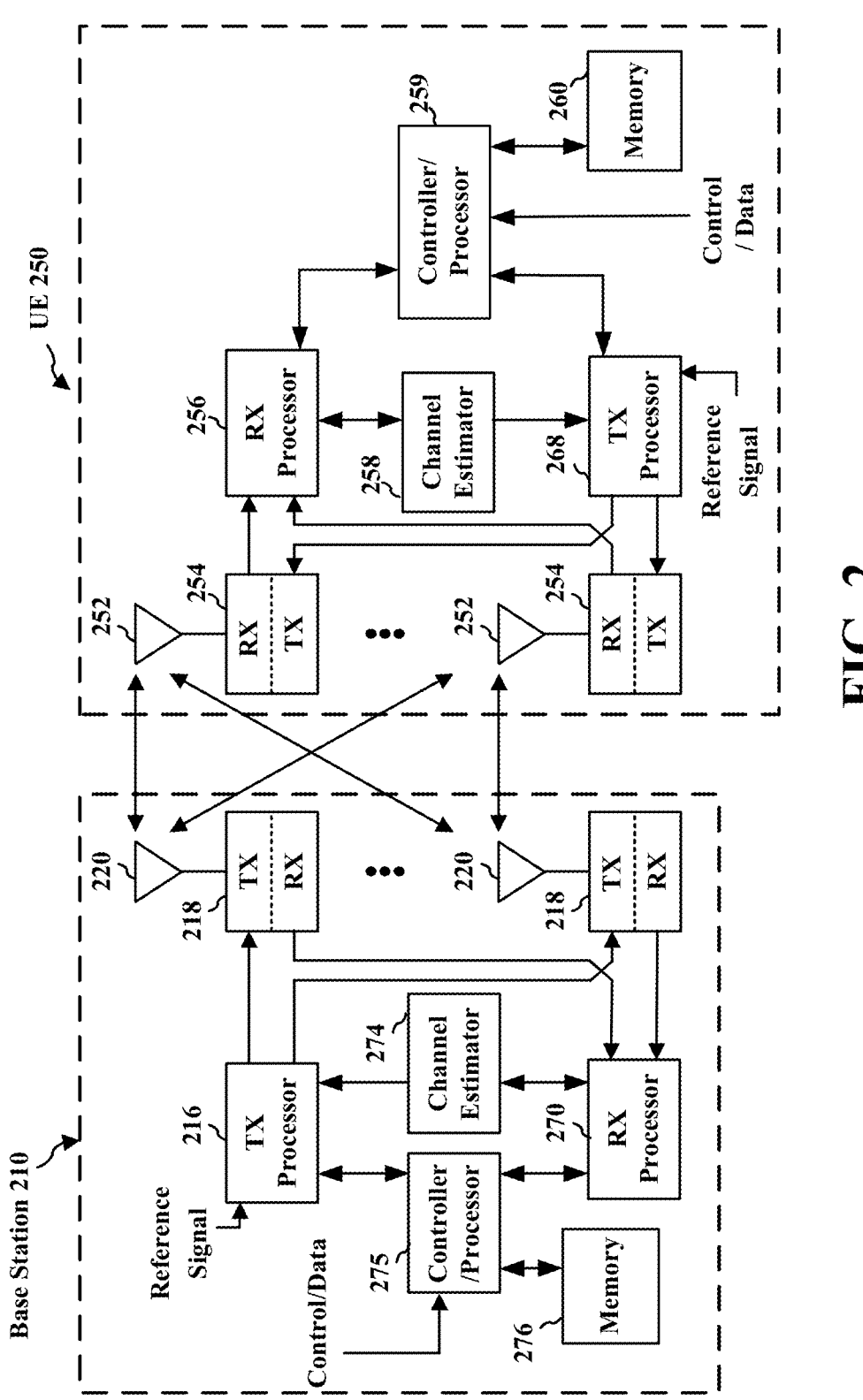
FIG. 2 is a diagram illustrating a base station in communication with a UE in an access network.

FIG. 2 is a block diagram of a base station 210 in communication with a UE 250 in an access network. In the DL, IP packets from the EPC 160 may be provided to a controller/processor 275. The controller/processor 275 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 275 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 216 and the receive (RX) processor 270 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 216 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 274 may be used to determine the coding and modulation scheme, as well as for spatial processing. The channel estimate may be derived from a reference signal and/or channel condition feedback transmitted by the UE 250. Each spatial stream may then be provided to a different antenna 220 via a separate transmitter 218TX. Each transmitter 218TX may modulate an RF carrier with a respective spatial stream for transmission.

At the UE 250, each receiver 254RX receives a signal through its respective antenna 252. Each receiver 254RX recovers information modulated onto an RF carrier and provides the information to the receive (RX) processor 256. The TX processor 268 and the RX processor 256 implement layer 1 functionality associated with various signal processing functions. The RX processor 256 may perform spatial processing on the information to recover any spatial streams destined for the UE 250. If multiple spatial streams are destined for the UE 250, they may be combined by the RX processor 256 into a single OFDM symbol stream. The RX processor 256 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 210. These soft decisions may be based on channel estimates computed by the channel estimator 258. The soft decisions are then decoded and deinterleaved to recover the data and control signals that were originally transmitted by the base station 210 on the physical channel. The data and control signals are then provided to the controller/processor 259, which implements layer 3 and layer 2 functionality.

The controller/processor 259 can be associated with a memory 260 that stores program codes and data. The memory 260 may be referred to as a computer-readable medium. In the UL, the controller/processor 259 provides demultiplexing between transport and logical channels, packet reassembly, deciphering, header decompression, and control signal processing to recover IP packets from the EPC 160. The controller/processor 259 is also responsible for error detection using an ACK and/or NACK protocol to support HARQ operations.

Similar to the functionality described in connection with the DL transmission by the base station 210, the controller/processor 259 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 258 from a reference signal or feedback transmitted by the base station 210 may be used by the TX processor 268 to select the appropriate coding and modulation schemes, and to facilitate spatial processing. The spatial streams generated by the TX processor 268 may be provided to different antenna 252 via separate transmitters 254TX. Each transmitter 254TX may modulate an RF carrier with a respective spatial stream for transmission. The UL transmission is processed at the base station 210 in a manner similar to that described in connection with the receiver function at the UE 250. Each receiver 218RX receives a signal through its respective antenna 220. Each receiver 218RX recovers information modulated onto an RF carrier and provides the information to a RX processor 270.

The controller/processor 275 can be associated with a memory 276 that stores program codes and data. The memory 276 may be referred to as a computer-readable medium. In the UL, the controller/processor 275 provides demultiplexing between transport and logical channels, packet reassembly, deciphering, header decompression, control signal processing to recover IP packets from the UE 250. IP packets from the controller/processor 275 may be provided to the EPC 160. The controller/processor 275 is also responsible for error detection using an ACK and/or NACK protocol to support HARQ operations.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may utilize OFDM with a cyclic prefix (CP) on the uplink and downlink and may include support for half-duplex operation using time division duplexing (TDD). NR may include Enhanced Mobile Broadband (eMBB) service targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC) service.

A single component carrier bandwidth of 100 MHz may be supported. In one example, NR resource blocks (RBs) may span 12 sub-carriers with a sub-carrier bandwidth of 60 kHz over a 0.25 ms duration or a bandwidth of 30 kHz over a 0.5 ms duration (similarly, 50 MHz BW for 15 kHz SCS over a 1 ms duration). Each radio frame may consist of 10 subframes (10, 20, 40 or 80 NR slots) with a length of 10 ms. Each slot may indicate a link direction (i.e., DL or UL) for data transmission and the link direction for each slot may be dynamically switched. Each slot may include DL/UL data as well as DL/UL control data. UL and DL slots for NR may be as described in more detail below with respect to FIGS. 5 and 6.

The NR RAN may include a central unit (CU) and distributed units (DUs). A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity and may not be used for initial access, cell selection/reselection, or handover. In some cases DCells may not transmit synchronization signals (SS) in some cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 3:
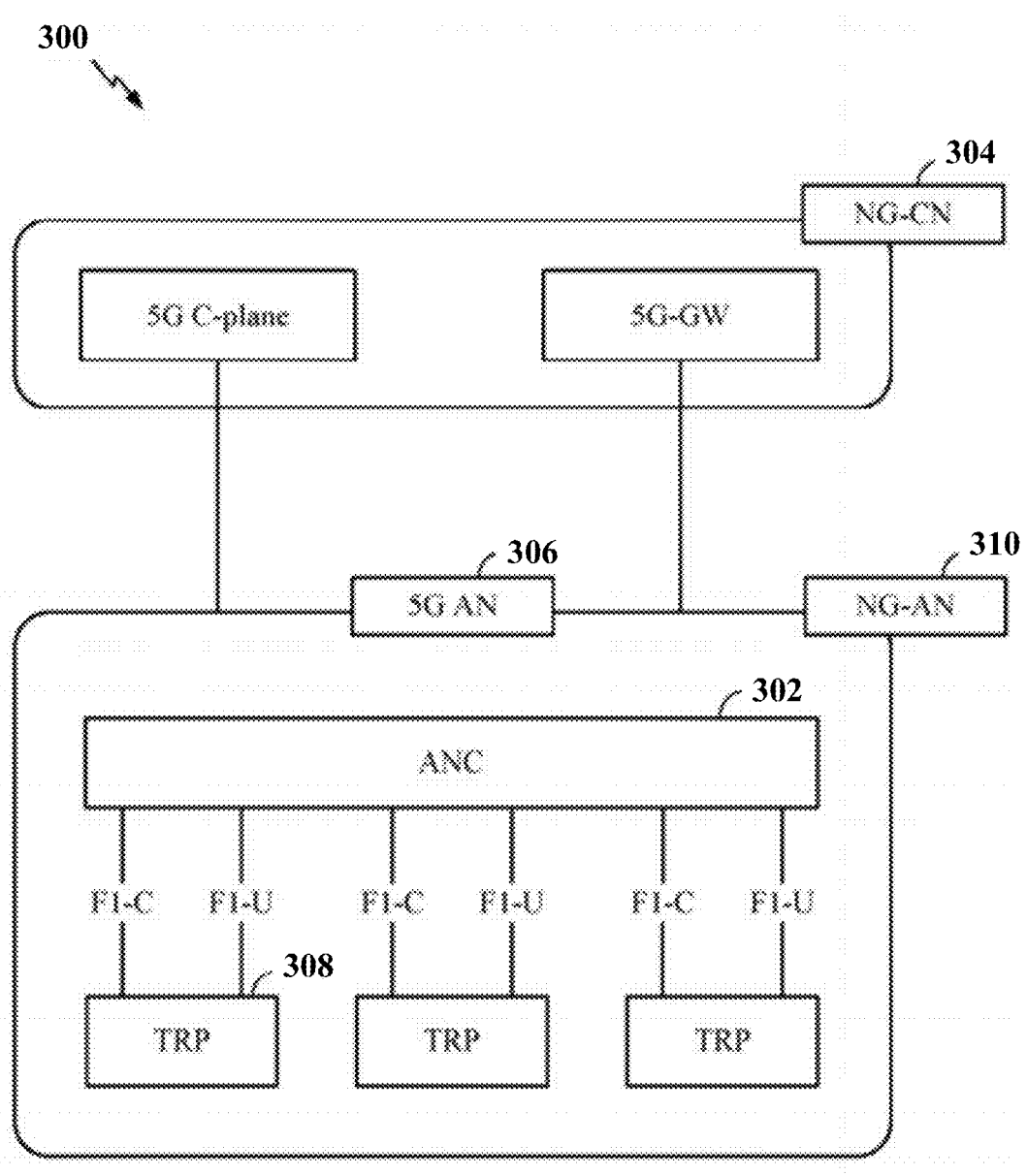
FIG. 3 illustrates an example logical architecture of a distributed access network.

FIG. 3 illustrates an example logical architecture of a distributed RAN 300, according to aspects of the present disclosure. A 5G access node 306 may include an access node controller (ANC) 302. The ANC may be a central unit (CU) of the distributed RAN. The backhaul interface to the next generation core network (NG-CN) 304 may terminate at the ANC. The backhaul interface to neighboring next generation access nodes (NG-ANs) 310 may terminate at the ANC. The ANC may include one or more TRPs 308 (which may also be referred to as BSs, NR BSs, Node Bs, 5G NBs, APs, or some other term). As described above, a TRP may be used interchangeably with "cell."

The TRPs 308 may be a distributed unit (DU). The TRPs may be connected to one ANC (ANC 302) or more than one ANC (not illustrated). For example, for RAN sharing, radio as a service (RaaS), and service specific ANC deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of the distributed RAN 300 may be used to illustrate fronthaul definition. The architecture may be defined that support fronthauling solutions across different deployment types. For example, the architecture may be based on transmit network capabilities (e.g., bandwidth, latency, and/or jitter). The architecture may share features and/or components with LTE. According to aspects, the next generation AN (NG-AN) 310 may support dual connectivity with NR. The NG-AN may share a common fronthaul for LTE and NR.

The architecture may enable cooperation between and among TRPs 308. For example, cooperation may be preset within a TRP and/or across TRPs via the ANC 302. According to aspects, no inter-TRP interface may be needed/present.

According to aspects, a dynamic configuration of split logical functions may be present within the architecture of the distributed RAN 300. The PDCP, RLC, MAC protocol may be adaptably placed at the ANC or TRP.

Figure 4:
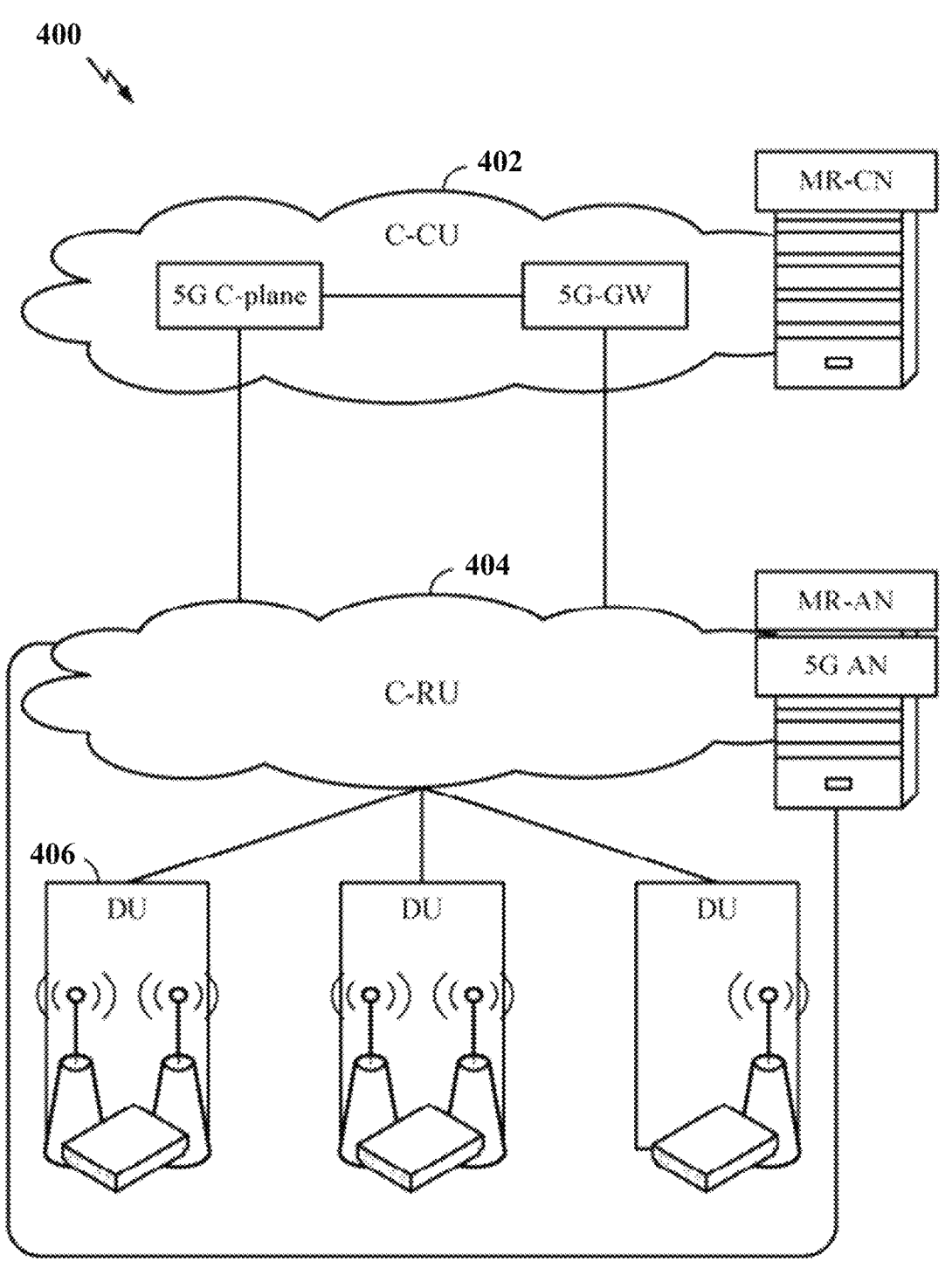
FIG. 4 illustrates an example physical architecture of a distributed access network.

FIG. 4 illustrates an example physical architecture of a distributed RAN 400, according to aspects of the present disclosure. A centralized core network unit (C-CU) 402 may host core network functions. The C-CU may be centrally deployed. C-CU functionality may be offloaded (e.g., to advanced wireless services (AWS)), in an effort to handle peak capacity. A centralized RAN unit (C-RU) 404 may host one or more ANC functions. Optionally, the C-RU may host core network functions locally. The C-RU may have distributed deployment. The C-RU may be closer to the network edge. A distributed unit (DU) 406 may host one or more TRPs. The DU may be located at edges of the network with radio frequency (RF) functionality.

Figure 5:
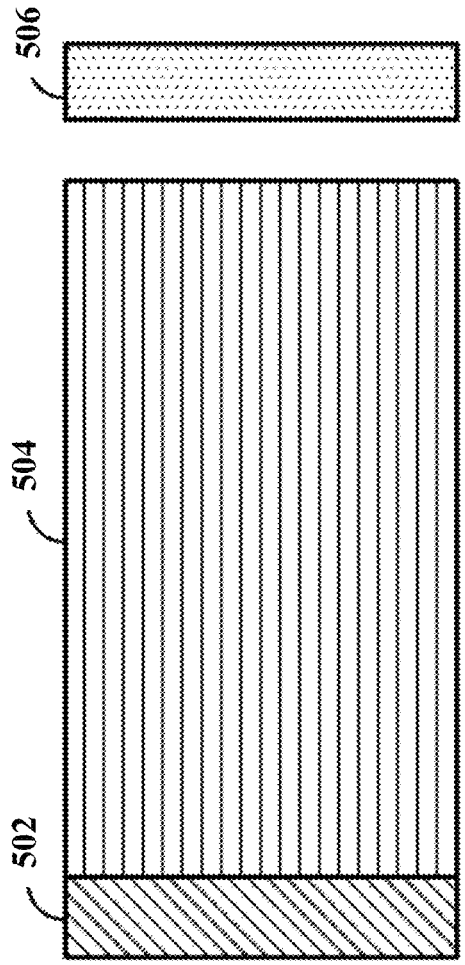
FIG. 5 is a diagram showing an example of a DL-centric slot.
Figure 5:
Figure 5:
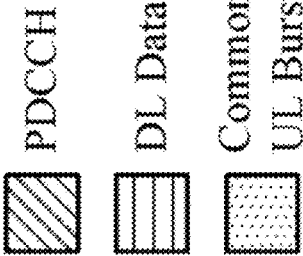

FIG. 5 is a diagram 500 showing an example of a DL-centric slot. The DL-centric slot may include a control portion 502. The control portion 502 may exist in the initial or beginning portion of the DL-centric slot. The control portion 502 may include various scheduling information and/or control information corresponding to various portions of the DL-centric slot. In some configurations, the control portion 502 may be a physical DL control channel (PDCCH), as indicated in FIG. 5. The DL-centric slot may also include a DL data portion 504. The DL data portion 504 may sometimes be referred to as the payload of the DL-centric slot. The DL data portion 504 may include the communication resources utilized to communicate DL data from the scheduling entity (e.g., UE or BS) to the subordinate entity (e.g., UE). In some configurations, the DL data portion 504 may be a physical DL shared channel (PDSCH).

The DL-centric slot may also include a common UL portion 506. The common UL portion 506 may sometimes be referred to as an UL burst, a common UL burst, and/or various other suitable terms. The common UL portion 506 may include feedback information corresponding to various other portions of the DL-centric slot. For example, the common UL portion 506 may include feedback information corresponding to the control portion 502. Non-limiting examples of feedback information may include an ACK signal, a NACK signal, a HARQ indicator, and/or various other suitable types of information. The common UL portion 506 may include additional or alternative information, such as information pertaining to random access channel (RACH) procedures, scheduling requests (SRs), and various other suitable types of information.

As illustrated in FIG. 5, the end of the DL data portion 504 may be separated in time from the beginning of the common UL portion 506. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric slot and alternative structures having similar features may exist without necessarily deviating from the aspects described herein.

Figure 6:
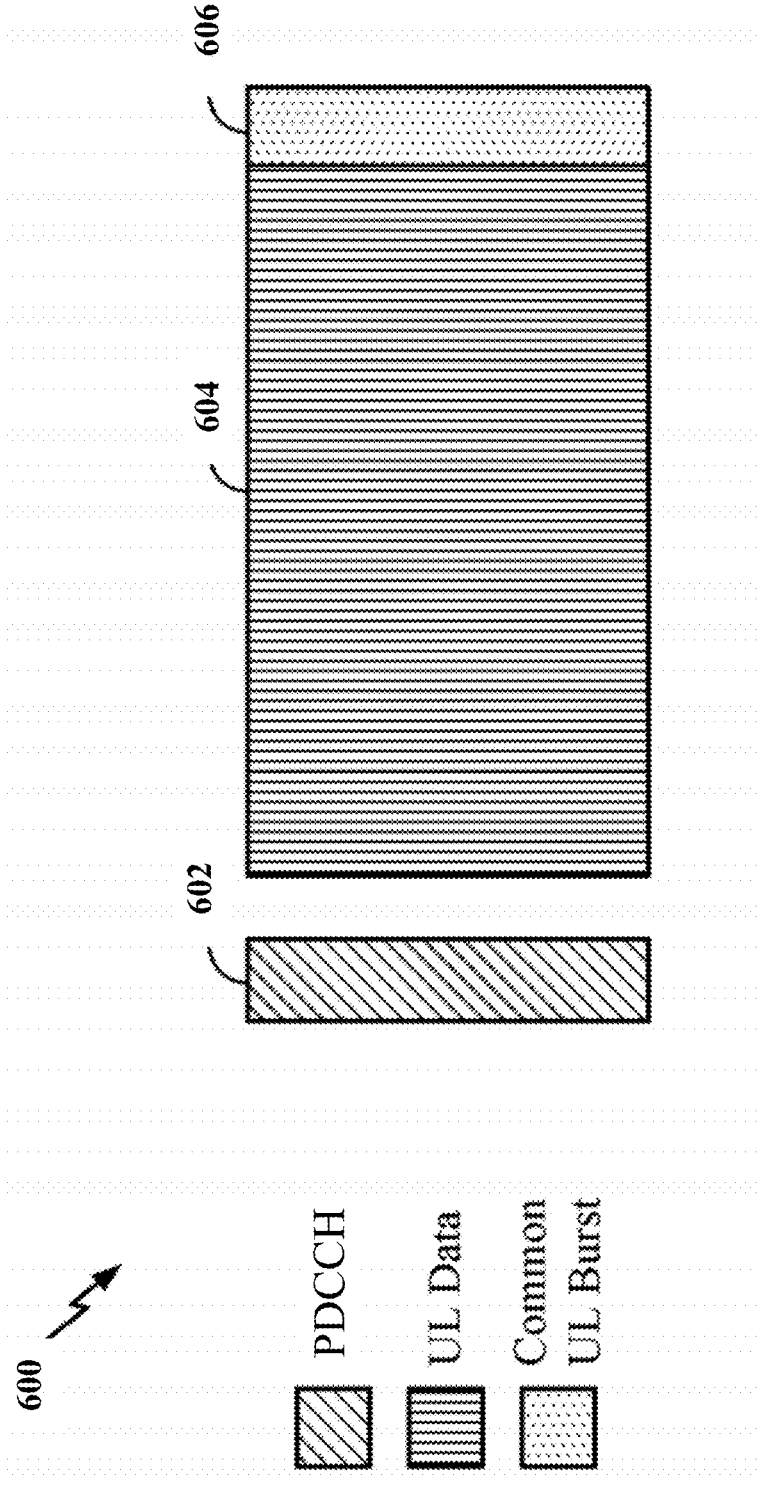
FIG. 6 is a diagram showing an example of an UL-centric slot.

FIG. 6 is a diagram 600 showing an example of an UL-centric slot. The UL-centric slot may include a control portion 602. The control portion 602 may exist in the initial or beginning portion of the UL-centric slot. The control portion 602 in FIG. 6 may be similar to the control portion 502 described above with reference to FIG. 5. The UL-centric slot may also include an UL data portion 604. The UL data portion 604 may sometimes be referred to as the pay load of the UL-centric slot. The UL portion may refer to the communication resources utilized to communicate UL data from the subordinate entity (e.g., UE) to the scheduling entity (e.g., UE or BS). In some configurations, the control portion 602 may be a physical DL control channel (PDCCH).

As illustrated in FIG. 6, the end of the control portion 602 may be separated in time from the beginning of the UL data portion 604. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric slot may also include a common UL portion 606. The common UL portion 606 in FIG. 6 may be similar to the common UL portion 506 described above with reference to FIG. 5. The common UL portion 606 may additionally or alternatively include information pertaining to channel quality indicator (CQI), sounding reference signals (SRSs), and various other suitable types of information. One of ordinary skill in the art will understand that the foregoing is merely one example of an UL-centric slot and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

Although the baseband bandwidth for data channels PDSCH and PUSCH may be reduced to 5 MHz for an enhanced reduced capability (eRedCap) UE, the maximum bandwidth for other physical channels and signals remains 20 MHz. Since the eRedCap UE is expected to receive and process PDCCH, it is reasonable to assume a post-FFT data buffering size of 20 MHz for at least the initial symbols of a slot.

The "UE BB bandwidth reduction to 5 MHz" refers to the UE processing bandwidth, representing the number of resource elements (REs) that the eRedCap UE can process per slot. This UE processing bandwidth can be different from the UE reception bandwidth.

The UE reception bandwidth is the maximum bandwidth supported by the RF and baseband circuitry for receiving and buffering signals. For the eRedCap UE, the reception bandwidth remains 20 MHz to receive other physical channels and signals besides PDSCH/PUS CH.

The UE processing bandwidth refers to the number of REs that can be processed per slot, including operations like channel estimation, demodulation, and decoding. For the eRedCap UE, the processing bandwidth is reduced to 5 MHz for PDSCH and PUSCH data channels.

While further discussion is needed on potential reduction of post-FFT buffering in the remaining symbols of a slot, it is reasonable to assume a 20 MHz reception bandwidth for the eRedCap UE. This dual-mode support for NR and LTE implies a capability to receive and buffer 20 MHz signals in a slot.

In summary, the UE reception bandwidth can be considered 20 MHz for all symbols in a slot, while the UE processing bandwidth is reduced to 5 MHz for PDSCH and PUSCH for the eRedCap UE.

Figure 7:
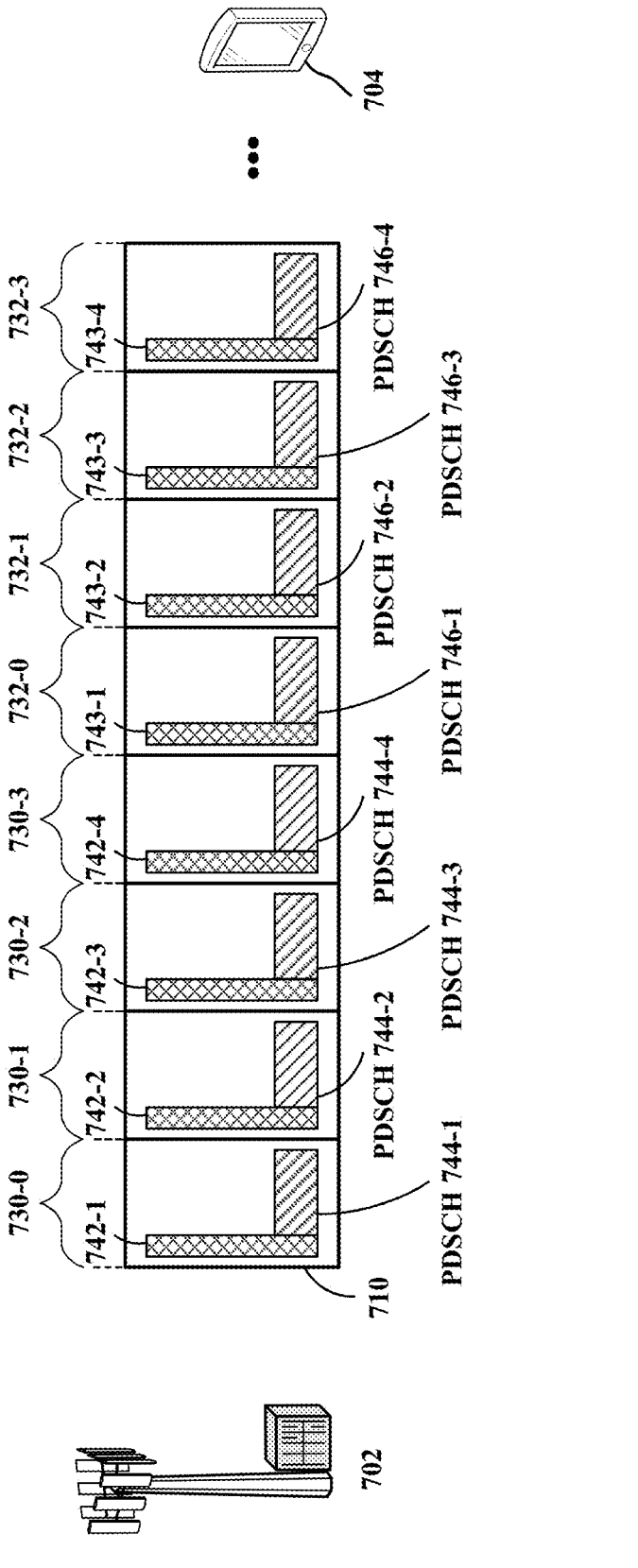
FIG. 7 is a diagram illustrating a first scheduling scheme by a base station for a reduced capability UE.

FIG. 7 is a diagram 700 illustrating a first scheduling scheme by a base station for a reduced capability UE. The reduced capability UE has a reduced processing bandwidth for data channels physical downlink shared channel (PDSCH) and physical uplink shared channel (PUSCH) compared to a standard capability UE. For other signals or channels, the reduced capability UE has the same maximum processing bandwidth for both baseband and radio frequency (RF) processing as the standard capability UE. The processing bandwidth represents the maximum number of resource elements that the reduced capability UE can process, including operations like channel estimation, demodulation, and decoding, in a transmission time interval (TTI) such as a slot.

In the example of FIG. 7, a base station 702 establishes communication with a reduced capability UE 704. The base station 702 transmits in a plurality of slots 730-0, 730-1, 730-2, 730-3, 732-0, 732-1, 732-2, 732-3, etc. In each slot, the base station 702 may schedule transmission of a physical downlink control channel (PDCCH) and an associated PDSCH. As an example, in slot 730-0, the base station 702 transmits PDCCH 742-1 and PDSCH 744-1; in slot 730-1, PDCCH 742-2 and PDSCH 744-2; and so on.

The reduced capability UE 704 has a processing bandwidth of 5 megahertz (MHz) per slot for PDSCH and 20 MHz per slot for PDCCH. The UE 704 indicates its reduced capability to the base station 702 via capability signaling. Accordingly, the base station 702 configures the transmission bandwidth of PDSCH to be within 5 MHz per slot. However, the UE 704 can still receive and process PDCCH with bandwidth up to 20 MHz per slot. Thus, in each slot, the UE 704 receives and processes the 20 MHz PDCCH (e.g., the PDCCH 742-1, etc.) and 5 MHz PDSCH (e.g., the PDSCH 744-1, etc.). This scheduling scheme accommodates the limited PDSCH processing capability of the reduced capability UE 704.

Figure 8:
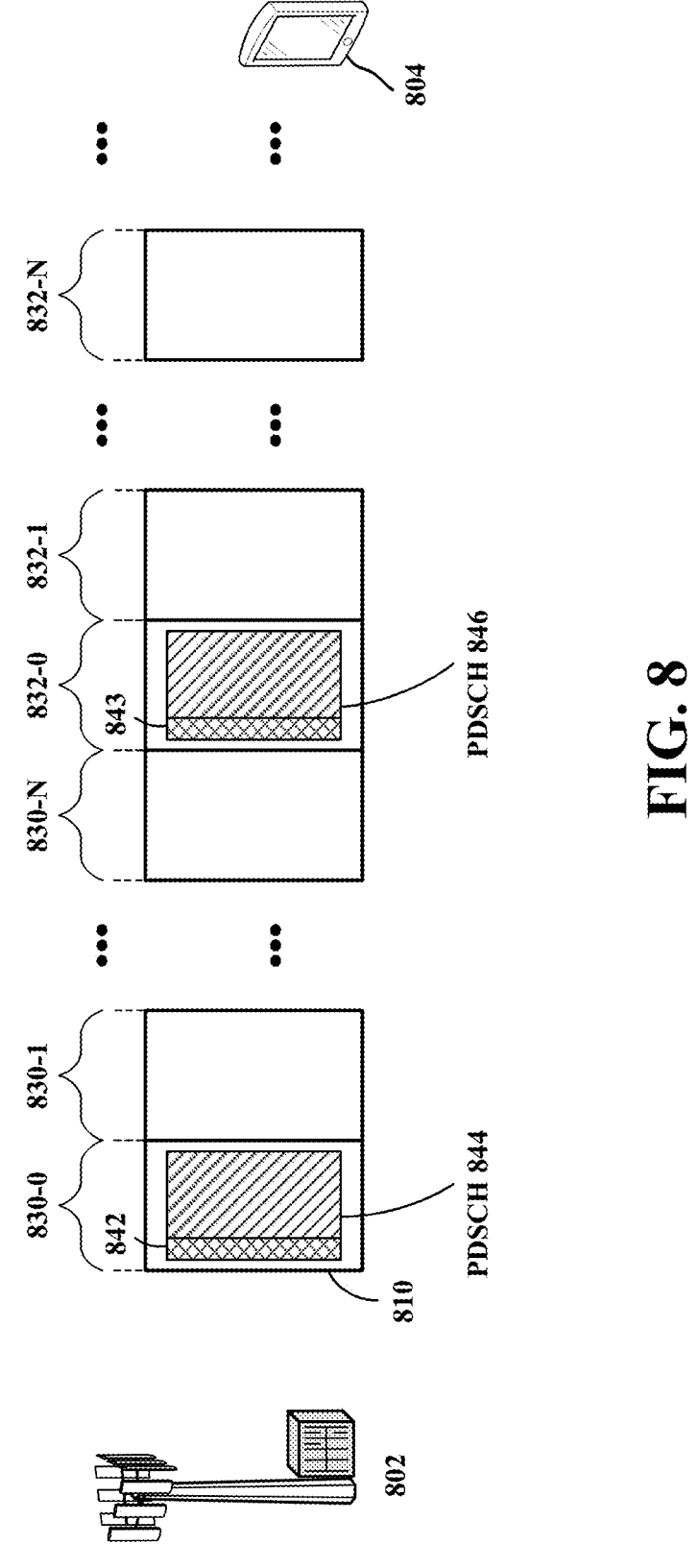
FIG. 8 is a diagram illustrating a second scheduling scheme by a base station for a reduced capability UE.

FIG. 8 is a diagram 800 illustrating a second scheduling scheme by a base station for a reduced capability UE. Similar to FIG. 7, the reduced capability UE 804 has a limited PDSCH processing bandwidth of 5 MHz per slot, but can receive and buffer PDSCH transmissions up to 20 MHz per slot.

In this example, the base station 802 establishes communication with the reduced capability UE 804 over a carrier 810. The base station 802 transmits in a plurality of slots 830-0, 830-1, . . . , 830-N, 832-0, 832-1, . . . , 832-N, etc. In certain scenarios, the base station 802 may transmit PDSCH signals wider than 5 MHz, such as for broadcast transmissions to multiple UEs.

To accommodate the limited PDSCH processing capability of the UE 804, the base station 802 applies scheduling gaps after transmitting wideband PDSCH. For example, in slot 830-0, the base station 802 transmits a 20 MHz PDCCH 842 and 20 MHz PDSCH 844. The base station 802 then refrains from transmitting another PDSCH to the UE 804 for N slots from slot 830-1 to 830-N. Then from slot 830-1 to 830-N, which is a scheduling gap, the UE 804 does not expect to receive or decode another PDSCH, allowing the UE 804 time to process the 20 MHz PDSCH 844 received in slot 830-0. The number of slots N can be determined based on the frequency resource allocation of the PDSCH including its bandwidth. Furthermore, it can be determined based on the UE processing bandwidth. For example, N may be 3.

During the scheduling gaps, the UE 804 may turn off RF circuitry for power savings, stop PDCCH monitoring or PDSCH reception, etc. After the scheduling gap of N slots, the base station 802 resumes scheduling transmissions to the UE, such as the PDCCH 843 and PDSCH 846 in slot 832-0. Accordingly, subsequent to the slot 830-N, the UE receives the PDCCH 843 and the PDSCH 846 in slot 832-0. This scheduling scheme accommodates the limited processing capability of the reduced capability UE 804.

To accommodate the limited PDSCH processing capability of the UE 804, the UE may prioritize processing one PDSCH over the other PDSCHs if the base station 802 does not refrain from transmitting two PDSCHs in the same slot when at least one of them is a wideband PDSCH. For example, the wideband PDSCH carries system information blocks (SIBs) and the other PDSCH is a unicast PDSCH. The UE may prioritize processing the wideband PDSCH with SIBs. Alternatively, the UE may prioritize processing the unicast PDSCH.

To reduce PDCCH scheduling overhead when scheduling the reduced capability UE, the base station can support a multi-slot PDSCH scheduling technique. In this scheme, a single PDCCH is used to schedule PDSCH transmissions across multiple slots. For example, the base station can transmit a PDCCH in slot X that schedules PDSCH transmissions in slots X+1, X+2 and X+3. This avoids the need for separate PDCCHs in each slot to schedule a PDSCH transmission in that slot.

In the example of FIG. 7, according to this technique, the PDCCH 742-1 may schedule transmissions of PDSCHs 744-1, 744-2, 744-3, 744-4. In the example of FIG. 8, according to this technique, the PDCCH 842 may schedule transmissions of PDSCHs 844, 846.

Figure 9:
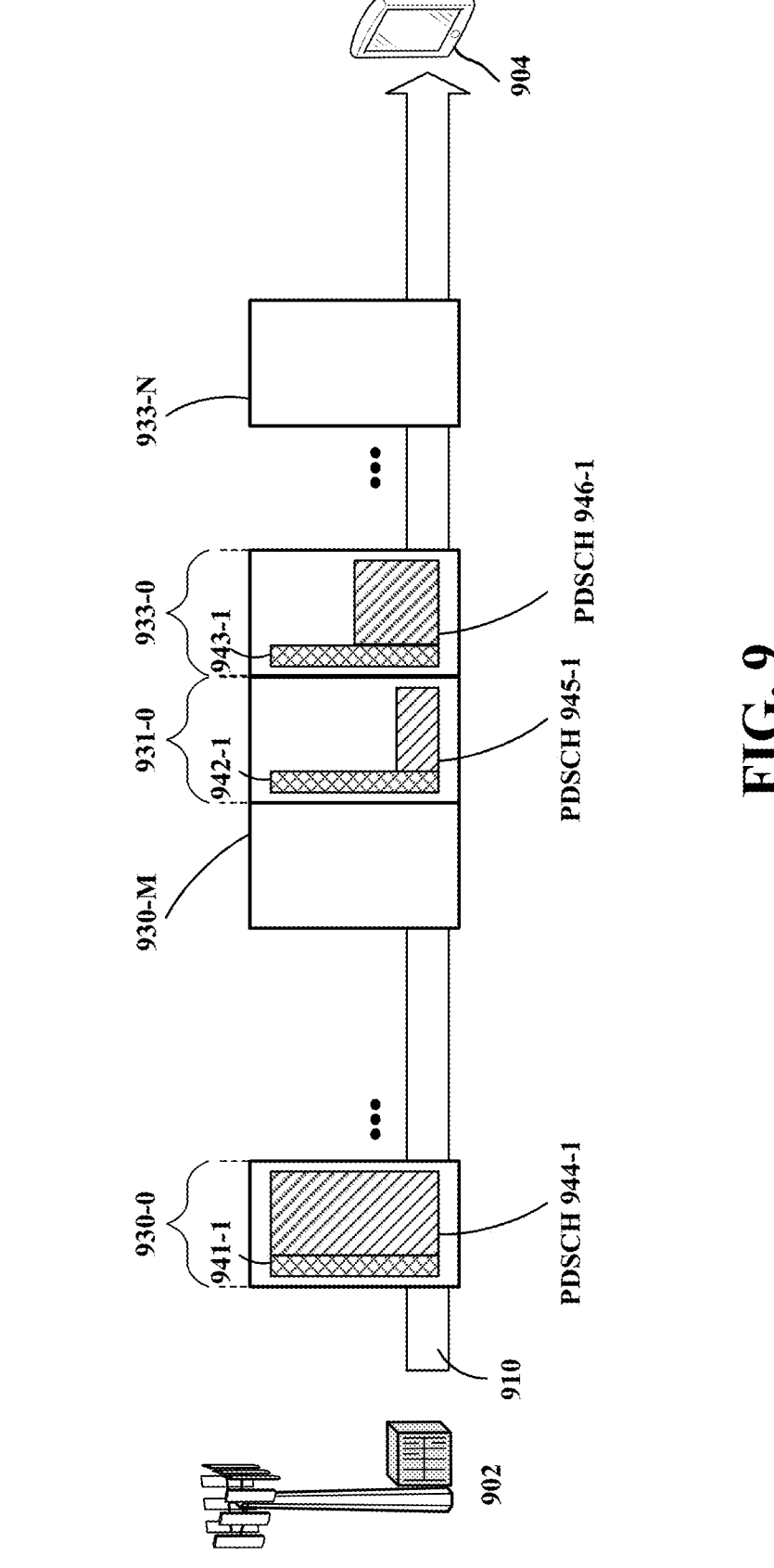
FIG. 9 is another diagram illustrating the second scheduling scheme by a base station for a reduced capability UE.

FIG. 9 is another diagram 900 illustrating the second scheduling scheme by a base station for a reduced capability UE. In this example, an eRedCap UE 904 has a processing bandwidth of 5 MHz per slot and a receiving bandwidth of 20 MHz per slot for PDSCHs. The eRedCap UE 904 is expected to be able to receive and process PDCCHs with a bandwidth up to 20 MHz per slot. The eRedCap UE 904 with less-capable processing capability can report its capability to the base station 902 via capability signaling.

In this example, a base station 902 establishes communication with the eRedCap UE 904 over a carrier 910. The base station 902 transmits in a plurality of slots 930-0, . . . , 930-M, 931-0, 933-0, . . . , 933-N, etc. In certain scenarios, the base station 902 may transmit PDSCH signals wider than 5 MHz, such as for broadcast transmissions to multiple UEs.

To accommodate the limited PDSCH processing capability of the eRedCap UE 904, the base station 902 applies dynamically determined scheduling gaps after transmitting wideband PDSCH. The scheduling gaps are proportional to the bandwidth of the transmitted PDSCH. This dynamic scheduling gap technique accommodates the limited processing capability of the reduced capability eRedCap UE 904.

For example, in slot 930-0, the base station 902 transmits a 20 MHz PDCCH 941-1 and a 20 MHz PDSCH 944-1. Because the 20 MHz PDSCH 944-1 exceeds the eRedCap UE's 5 MHz processing bandwidth, the base station refrains from transmitting another PDSCH to the UE for M slots from 930-1 to 930-M to allow time for the UE to process the 20 MHz PDSCH. The number of slots M can be determined based on the ratio of the PDSCH bandwidth to the UE processing bandwidth. Since 20 MHz is 4 times larger than 5 MHz, M may be set to 4 slots in this example.

If the PDSCH bandwidth fits within the UE's capability, no scheduling gap is needed. For example, the 5 MHz PDSCH 945-1 transmitted in slot 931-0 does not exceed the UE's 5 MHz capability, so no scheduling gap is applied before transmitting signals in the next slot 933-0.

In the slot 933-0, the base station transmits a 20 MHz PDCCH 943-1 and a 10 MHz PDSCH 946-1. Because the 10 MHz PDSCH exceeds the 5 MHz processing bandwidth, the base station applies a scheduling gap from slots 931-1 to 931-N before transmitting the next PDSCH in a subsequent slot. Since the 10 MHz PDSCH is 2 times the 5 MHz processing bandwidth, N may be set to 2 slots. Accordingly, the scheduling gaps are proportional to the bandwidth of the transmitted PDSCH compared to the UE processing capability.

Figure 10:
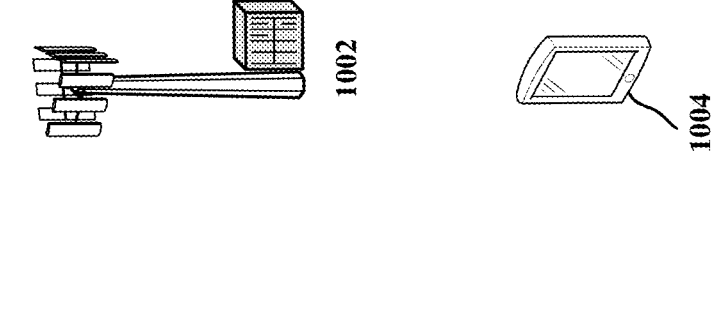
FIG. 10 is a diagram illustrating a random-access procedure of a reduced capability UE.

FIG. 10 is a diagram 1000 illustrating a random-access procedure of a reduced capability UE. An eRedCap UE 1004 has a limited processing bandwidth of 5 megahertz (MHz) per slot for physical downlink shared channel (PDSCH), but can receive and buffer PDSCH transmissions up to 20 MHz per slot. For other physical channels like physical downlink control channel (PDCCH), the eRedCap UE 1004 has the same maximum processing bandwidth of 20 MHz per slot as a standard capability UE.

The eRedCap UE 1004 transmits a random-access preamble 1040 to a base station 1002 at time to. The base station 1002 transmits a PDCCH 1042 carrying downlink control information (DCI) 1070 at time t1 which schedules transmission of a PDSCH 1044 carrying a random access response (RAR) at time t2. The PDSCH 1044 bandwidth depends on the number of RAR protocol data units (PDUs) responding to detected preambles from the same random access channel (RACH) occasion.

In a first option, if the PDSCH 1044 bandwidth does not exceed the eRedCap UE's 5 MHz processing capability, the minimum time gap between PDSCH 1044 and Message 3 PUSCH 1046 (t3–t2) follows the standard duration of N1+N2+0.5 ms, where N1 is the PDSCH processing time (i.e., time required for processing DL assignment and transmitting ACK/NACK on PUCCH), N2 is the PUSCH preparation time (time required for processing UL grant and preparing uplink PUSCH transmission), and 0.5 ms is for MAC processing (i.e., L2 processing).

However, if the PDSCH 1044 bandwidth exceeds 5 MHz, the base station 1002 schedules the UL grant in PDSCH 1044 to provide an additional time gap of N ms beyond the standard duration, where N depends on the frequency resource allocation of the PDSCH 1044 including its bandwidth. Furthermore, it can depend on eRedCap UE 1004 processing capability.

For example, if the eRedCap UE 1004 can process 5 MHz per slot, this is equivalent to 25 resource blocks (RB)×14 symbols per slot=350 RB symbols per slot with 15 kHz subcarrier spacing. If the RAR PDSCH 1044 is scheduled with 10 MHz bandwidth across 12 orthogonal frequency division multiplexing (OFDM) symbols, this is equivalent to 50 RB×12 symbols per slot=600 RB symbols per slot. Since the 10 MHz RAR PDSCH requires 600 RB symbols while the eRedCap UE 1004 can only process 350 RB symbols per slot, the additional time duration N needed for the eRedCap UE 1004 is at least (24−14)=10 more symbols, or 0.71 slot, to process the wider RAR PDSCH transmission. The eRed-Cap UE 1004 transmits Message 3 PUSCH 1046 after this extended duration between t2 and t3.

This scheduling approach allows the base station 1002 to accommodate the limited PDSCH processing capability of the eRedCap UE 1004 when the PDSCH 1044 bandwidth exceeds the UE's per slot processing capability. The additional scheduling gap is related to the frequency resource of the PDSCH including its bandwidth. It can be further related to the UE capability. For example, the additional scheduling gap can be proportional to the PDSCH bandwidth relative to the UE capability.

The base station 1002 can utilize the early indication in Message 1 from the eRedCap UE 1004 to apply longer time durations between the RAR PDSCH 1044 and Message 3 PUSCH 1046 compared to legacy UEs. This allows the base station 1002 to schedule RAR PDSCH transmissions exceeding 5 MHz specifically for the eRedCap UE 1004 since it is aware of the UE's capabilities.

Alternatively, for simplicity the base station 1002 can schedule RAR UL grants to eRedCap UEs based on minimum timing requirements to accommodate the limited processing capability, regardless of any early indication in Message 1. This approach schedules RAR transmission to eRedCap UEs using the same enhanced timing in a cell that allows eRedCap UEs to camp, without relying on early indication.

In a second option, the base station 1002 supports dedicated RAR PDSCH transmissions scheduled in RBs not exceeding 5 MHz specifically for eRedCap UEs. This option requires the early indication in Message 1 to differentiate eRedCap UEs. The base station 1002 needs to transmit the dedicated RAR PDSCH for eRedCap UEs in a separate slot since two PDCCHs cannot be transmitted with the same random access RNTI in the same slot.

Both the first option of scheduling relaxed timings for eRedCap UEs and the second option of dedicated RAR PDSCH transmissions may or may not require the separate Message 1 early indication, depending on the specific implementation by the base station 1002. The early indication can help differentiate eRedCap UEs, but may not be strictly necessary if the base station applies consistent scheduling rules for eRedCap UEs within a cell.

Subsequently, the base station 1002 transmits a PDCCH 1047 at t4 that schedules the transmission of a Msg4 PDSCH 1048 at t5. When scheduling of Msg4 PDSCH 1048 for the eRedCap UE 1004 with limited per slot PDSCH processing capability, in a first technique, the base station 1002 schedules a Msg4 PDSCH 1048 transmission within the eRedCap UE's per slot PDSCH processing bandwidth of 5 MHz. This allows the eRedCap UE 1004 to process the Msg4 PDSCH 1048 within its capability. To maintain performance within the limited 5 MHz bandwidth, techniques such as Msg4 payload size reduction, slot aggregation, and multi-slot PDSCH scheduling can be used.

In a second technique, the base station schedules a Msg4 PDSCH 1048 exceeding 5 MHz by allowing additional slots for the HARQ ACK feedback. For example, if the eRedCap UE 1004 receives a 20 MHz Msg4 PDSCH 1048, it may require 4 slots to process the 20 MHz transmission. An adaptive scheduling of the ACK in 3 slots later than the original design for legacy UEs can accommodate the eRed-Cap UE's limited per slot processing capability.

The base station 1002 can utilize the eRedCap UE's early indication to apply appropriate Msg4 PDSCH 1048 scheduling and timing enhancements specific to the eRedCap UE 1004. Alternatively, the base station 1002 can apply consistent Msg4 scheduling rules for eRedCap UEs within a cell, without relying on early indication.

This scheduling approach allows the base station 1002 to accommodate the limited per slot PDSCH processing capability of the eRedCap UE 1004 when scheduling Msg4 PDSCH transmissions potentially exceeding the UE's capability. The additional scheduling gap is related to the frequency resource of the PDSCH including its bandwidth. It can be further related to the UE capability. For example, the additional scheduling gap can be proportional to the Msg4 PDSCH bandwidth relative to the UE's capability.

Figure 11:
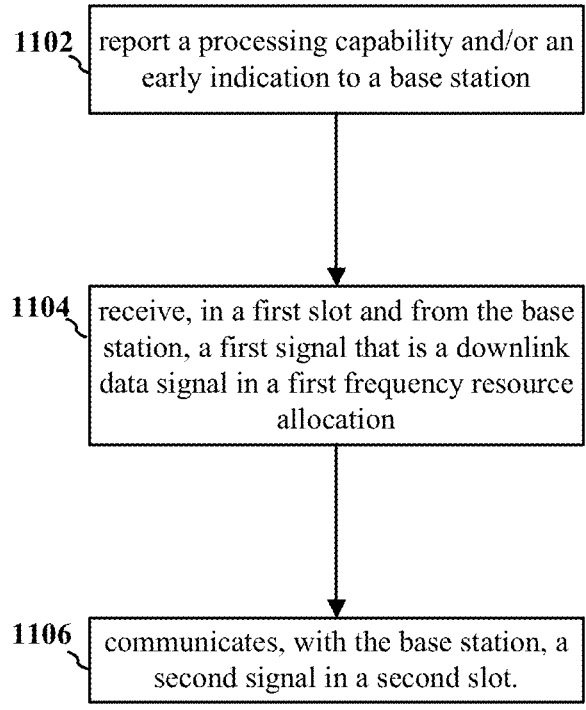
FIG. 11 is a flow chart of a method (process) for receiving data from a base station.

FIG. 11 is a flow chart 1100 of a method (process) for receiving data from a base station. The method may be performed by a UE (e.g., the UE 704, the UE 804, the UE 904, the UE 1004, the UE 250). In operation 1102, the UE may report a processing capability and/or an early indication of the processing capability to a base station. In operation 1104, the UE receives, in a first slot and from a base station, a first signal that is a downlink data signal in a first frequency resource allocation. The downlink data signal may be a physical downlink shared channel (PDSCH) carrying data.

In operation 1106, the UE communicates, with the base station, a second signal in a second slot. A configured time gap between the first slot and the second slot is according to a comparison of the first frequency resource allocation and a second frequency resource allocation. In certain configurations, the first frequency resource allocation has a first bandwidth of the first signal. The first bandwidth is a total bandwidth span of frequency resources of the first signal or a total utilized bandwidth of the frequency resources of the first signal. The second frequency resource allocation has a second bandwidth. The second bandwidth may be pre-configured at the UE or received from the base station. In certain configurations, the second bandwidth correlates with a processing capability of the UE. In certain configurations, the comparison of the first frequency resource allocation and the second frequency resource allocation is a comparison of the first bandwidth and the second bandwidth.

When the second bandwidth is less than the first bandwidth, the configured time gap is a first time gap and includes one or more slots that allow the UE to process at least the first signal and the second signal. When the second bandwidth is not less than the first bandwidth, the configured time gap is a second time gap and includes zero or more slots that allow the UE to process at least the first signal and the second signal. In certain configurations, the first time gap is not smaller than the second time gap.

In certain configurations, the first time gap is N1+N2+X+N and the second time gap is N1+N2+X. N1 represents a PDSCH processing time corresponding to a capability of the UE. N2 represents a PUSCH preparation time corresponding to the capability of the UE. X represents a time duration required for UE to process medium access control (MAC) control elements (CEs). N represents an additional time duration that the UE requires for processing a random access response (RAR) message that is scheduled in a frequency resource allocation larger than the second bandwidth.

In certain configurations, the downlink data signal comprises a physical downlink shared channel (PDSCH) carrying a random access response (RAR) message with a RAR uplink (UL) grant, and the second signal comprises a physical uplink shared channel (PUSCH) scheduled by the RAR UL grant. In certain configurations, the downlink data signal comprises a MsgB physical downlink shared channel (PDSCH) in a random access procedure, and the second signal comprises a physical uplink control channel (PUCCH) carrying a hybrid automatic repeat request (HARQ) acknowledgement (ACK) in response to receiving the MsgB PDSCH.

Figure 12:
FIG. 12 is a flow chart of a method (process) for transmitting data to a UE
Figure 12:
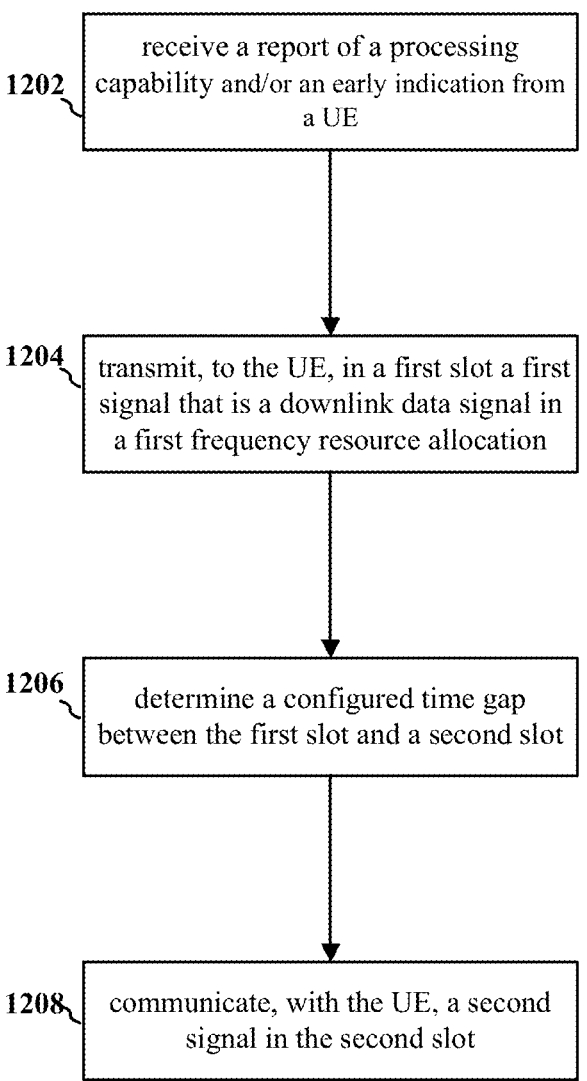

FIG. 12 is a flow chart 1200 of a method (process) for transmitting data to a UE. The method may be performed by a base station (e.g., the base station 702, the base station 802, the base station 902, the base station 1002, the base station 210). In operation 1202, the base station receives a report of a processing capability and/or an early indication of the processing capability from a UE. In operation 1204, the base station transmits, to the UE, in a first slot a first signal that is a downlink data signal in a first frequency resource allocation. In operation 1206, the base station determines a configured time gap between the first slot and a second slot according to a comparison of the first frequency resource allocation and a second frequency resource allocation.

The first frequency resource allocation has a first bandwidth of the first signal. The first bandwidth is a total bandwidth span of frequency resources of the first signal or a total utilized bandwidth of the frequency resources of the first signal. The second frequency resource allocation has a second bandwidth. In certain configurations, the second bandwidth correlates with a processing capability of the UE. The base station may signal the second bandwidth to the UE.

In certain configurations, the comparison of the first frequency resource allocation and the second frequency resource allocation is a comparison of the first bandwidth and the second bandwidth. When the second bandwidth is less than the first bandwidth, the configured time gap is determined to be a first time gap. The first time gap includes one or more slots that allow the UE to process at least the first signal and the second signal. When the second bandwidth is not less than the first bandwidth, the configured time gap is determined to be a second time gap. The second time gap includes zero or more slots that allow the UE to process at least the first signal and the second signal. In certain configurations, the first time gap is not smaller than the second time gap.

In certain configurations, the first time gap is determined as N1+N2+X+N and the second time gap is determined as N1+N2+X. N1 represents a PDSCH processing time corresponding to a capability of the UE. N2 represents a PUSCH preparation time corresponding to the capability of the UE. X represents a time duration required for UE to process medium access control (MAC) control elements (CEs). N represents an additional time duration that the UE requires for processing a random access response (RAR) message that is scheduled in a frequency resource allocation larger than the second bandwidth.

In operation 1208, the base station communicates, with the UE, a second signal in the second slot. In certain configurations, the downlink data signal comprises a physical downlink shared channel (PDSCH) carrying a random access response (RAR) message with a RAR uplink (UL) grant, and the second signal comprises a physical uplink shared channel (PUSCH) scheduled by the RAR UL grant. In certain configurations, the downlink data signal comprises a MsgB physical downlink shared channel (PDSCH)

in a random access procedure, and the second signal comprises a physical uplink control channel (PUCCH) carrying a hybrid automatic repeat request (HARQ) acknowledgement (ACK) in response to receiving the MsgB PDSCH.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a user equipment (UE), comprising:

receiving, in a first slot and from a base station, a first signal that is a downlink data signal in a first frequency resource allocation, wherein the first frequency resource allocation has a first bandwidth of the first signal, wherein the first bandwidth is a total bandwidth span of frequency resources of the first signal or a total utilized bandwidth of the frequency resources of the first signal; and communicating, with the base station, a second signal in a second slot, wherein a configured time gap between the first slot and the second slot is according to a comparison of the first frequency resource allocation and a second frequency resource allocation, wherein the second frequency resource allocation has a second bandwidth, wherein the comparison of the first frequency resource allocation and the second frequency resource allocation is a comparison of the first bandwidth and the second bandwidth.

2. The method of claim 1, wherein when the second bandwidth is less than the first bandwidth, the configured time gap is a first time gap and includes one or more slots that allow the UE to process at least the first signal and the second signal.

3. The method of claim 2, wherein when the second bandwidth is not less than the first bandwidth, the configured time gap is a second time gap and includes zero or more slots that allow the UE to process at least the first signal and the second signal.

4. The method of claim 3, wherein the first time gap is not smaller than the second time gap.

5. The method of claim 3, wherein the first time gap is N1+N2+X+N and the second time gap is N1+N2+X, wherein:

N1 represents a PDSCH processing time corresponding to a capability of the UE,

N2 represents a PUSCH preparation time corresponding to the capability of the UE, X represents a time duration required for UE to process medium access control (MAC) control elements (CEs); and N represents an additional time duration that the UE requires for processing a random access response (RAR) message that is scheduled in a frequency resource allocation larger than the second bandwidth.

6. The method of claim 1, wherein the second bandwidth is pre-configured at the UE or received from the base station.

7. The method of claim 1, wherein the second bandwidth correlates with a processing capability of the UE.

8. The method of claim 7, further comprising: reporting the processing capability to the base station.

9. The method of claim 1, wherein the downlink data signal comprises a physical downlink shared channel (PDSCH) carrying a random access response (RAR) message with a RAR uplink (UL) grant, and wherein the second signal comprises a physical uplink shared channel (PUSCH) scheduled by the RAR UL grant.

10. The method of claim 1, wherein the downlink data signal comprises a MsgB physical downlink shared channel (PDSCH) in a random access procedure, and wherein the second signal comprises a physical uplink control channel (PUCCH) carrying a hybrid automatic repeat request (HARQ) acknowledgement (ACK) in response to receiving the MsgB PDSCH.

11. A method of wireless communication of a base station, comprising:

transmitting, in a first slot, a first signal that is a downlink data signal in a first frequency resource allocation, wherein the first frequency resource allocation has a first bandwidth of the first signal, wherein the first bandwidth is a total bandwidth span of frequency resources of the first signal or a total utilized bandwidth of the frequency resources of the first signal; and communicating, with a user equipment (UE), a second signal in a second slot, wherein a configured time gap between the first slot and the second slot is according to a comparison of the first frequency resource allocation and a second frequency resource allocation, wherein the second frequency resource allocation has a second bandwidth, wherein the comparison of the first frequency resource allocation and the second frequency resource allocation is a comparison of the first bandwidth and the second bandwidth.

12. The method of claim 11, wherein when the second bandwidth is less than the first bandwidth, the configured time gap is a first time gap and includes one or more slots that allow the UE to process at least the first signal and the second signal.

13. The method of claim 12, wherein when the second bandwidth is not less than the first bandwidth, the configured time gap is a second time gap and includes zero or more slots that allow the UE to process at least the first signal and the second signal.

14. The method of claim 13, wherein the first time gap is not smaller than the second time gap.

15. The method of claim 13, wherein the first time gap is N1+N2+X+N and the second time gap is N1+N2+X, wherein:

N1 represents a PDSCH processing time corresponding to a capability of the UE,

N2 represents a PUSCH preparation time corresponding to the capability of the UE, X represents a time duration required for the UE to process medium access control (MAC) control elements (CEs); and N represents an additional time duration for the UE to process a random access response (RAR) message scheduled in a frequency resource allocation larger than the second bandwidth.

16. An apparatus for wireless communication, the apparatus being a user equipment (UE), comprising:

a memory; and at least one processor coupled to the memory and configured to:

receive, in a first slot and from a base station, a first signal that is a downlink data signal in a first frequency resource allocation, wherein the first frequency resource allocation has a first bandwidth of the first signal, wherein the first bandwidth is a total bandwidth span of frequency resources of the first signal or a total utilized bandwidth of the frequency resources of the first signal; and communicate, with the base station, a second signal in a second slot, wherein a configured time gap between the first slot and the second slot is according to a comparison of the first frequency resource allocation and a second frequency resource allocation, wherein the second frequency resource allocation has a second bandwidth, wherein the comparison of the first frequency resource allocation and the second frequency resource allocation is a comparison of the first bandwidth and the second bandwidth.

* * * * *